(12) United States Patent
Aldossary

(10) Patent No.: US 8,958,849 B2
(45) Date of Patent: Feb. 17, 2015

(54) THREE BUTTON CELL PHONE

(71) Applicant: Abdullah Aldossary, Hamden, CT (US)

(72) Inventor: Abdullah Aldossary, Hamden, CT (US)

( * ) Notice: Subject to any disclaimer, the term of this patent is extended or adjusted under 35 U.S.C. 154(b) by 0 days.

(21) Appl. No.: 13/737,132

(22) Filed: Jan. 9, 2013

(65) Prior Publication Data

US 2014/0194083 A1 Jul. 10, 2014

(51) Int. Cl.
*H04M 1/00* (2006.01)
*H04M 11/04* (2006.01)
(Continued)

(52) U.S. Cl.
CPC .......... *H04M 1/0202* (2013.01); *H04W 76/007* (2013.01); *H04M 1/6775* (2013.01); *H04M 1/72541* (2013.01); *H04W 88/02* (2013.01);
(Continued)

(58) Field of Classification Search
CPC ................... H04M 1/575–1/578; H04M 1/605; H04M 1/663; H04M 1/677; H04M 1/6775; H04M 1/27455; H04M 1/72541; H04M 1/72519; H04M 1/72583; H04M 1/274583; H04M 1/72594; H04M 1/0279; H04M 1/2476; H04M 1/2725; H04M 1/274525; H04M 1/72572; H04M 1/72586; H04M 2203/551; H04M 2250/10; H04M 2250/60; H04W 4/023; H04W 4/02; H04W 4/025; H04W 4/22; H04W 76/007; H04W 88/02; H04W 8/08; H04W 92/08; G06F 1/1632
USPC ........ 455/404.1, 404.2, 418, 550.1, 551, 557, 455/563–566, 569, 90.1; 379/355, 37, 379/106.02
See application file for complete search history.

(56) References Cited

U.S. PATENT DOCUMENTS 6,035,217 A 3/2000 Kravitz
2004/0185895 A1* 9/2004 Aisenberg .................. 455/550.1
(Continued)

FOREIGN PATENT DOCUMENTS

CN 202068463 U 12/2011
DE 196 27 447 A1 1/1998
(Continued)

OTHER PUBLICATIONS

Review: Simple Jitterbug Cell Phones Just Make Sense | Fox News; published Dec. 6, 2006 PCMag; http://www.foxnews.com/story/0,2933,234637,00.html; 5 pages.
(Continued)

*Primary Examiner* — Wesley Kim
*Assistant Examiner* — Umair Ahsan
(74) *Attorney, Agent, or Firm* — Oblon, Spivak, McClelland, Maier & Neustadt, L.L.P.

(57) ABSTRACT

A communication device that communicates via a base station through a radio link that includes: a display that displays an inquiry from a plurality of inquiries, a first input, which upon being activated, indicates an agreement in response to the inquiry, a second input, which upon being activated, indicates a disagreement in response to the inquiry, an emergency input, which upon being activated, indicates an emergency situation, a controller that selects and dials the phone number corresponding to the contact name from a plurality of phone numbers corresponding to a plurality of contact names based on the indicated agreement, the indicated disagreement, and the indicated emergency situation, such that the agreement and the disagreement with each inquiry of the plurality of inquiries guides the controller in selecting and dialing the phone number corresponding to the contact name from the plurality of phone numbers.

13 Claims, 6 Drawing Sheets

(51) Int. Cl.
  *H04M 1/02* (2006.01)
  *H04W 76/00* (2009.01)
  *H04M 1/677* (2006.01)
  *H04M 1/725* (2006.01)
  *H04W 88/02* (2009.01)
  *H04W 92/08* (2009.01)

(52) U.S. Cl.
  CPC ....... *H04M 1/72588* (2013.01); *H04M 2250/10* (2013.01); *H04W 92/08* (2013.01); *H04M 1/72572* (2013.01)
  USPC ...................... 455/564; 455/404.2; 455/569.1

(56) References Cited

U.S. PATENT DOCUMENTS

| | | | | |
|---|---|---|---|---|
| 2005/0176402 | A1* | 8/2005 | Verloop et al. | 455/404.1 |
| 2007/0087774 | A1* | 4/2007 | Richardson et al. | 455/550.1 |
| 2008/0004080 | A1* | 1/2008 | Li et al. | 455/564 |
| 2009/0197636 | A1* | 8/2009 | McBrearty et al. | 455/550.1 |
| 2009/0215439 | A1* | 8/2009 | Hamilton et al. | 455/418 |
| 2012/0064881 | A1* | 3/2012 | Svendsen | 455/422.1 |
| 2012/0311618 | A1* | 12/2012 | Blaxland | 725/9 |

FOREIGN PATENT DOCUMENTS

| | | |
|---|---|---|
| EP | 1 675 367 A1 | 6/2006 |
| GB | 2464920 A * | 5/2010 |
| JP | 2000-156812 A | 6/2000 |
| JP | 2004-062337 A | 2/2004 |
| KR | 10-0977122 B1 | 8/2010 |
| WO | WO 2005/125162 A1 | 12/2005 |

OTHER PUBLICATIONS

Lazy Thumb Phone Concept with Only Three Button | Tuvie; http://www.tuvie.com/lazy-thumb-phone-concept-with-only-three-button/; 15 pages.

* cited by examiner

THREE BUTTON CELL PHONE

GRANT OF NON-EXCLUSIVE RIGHT

This application was prepared with financial support from the Saudi Arabian Cultural Mission (SACM), and in consideration therefore the present inventor has granted The Kingdom of Saudi Arabia a non-exclusive right to practice the present disclosure.

BACKGROUND

Field of the Disclosure

The present application relates to a cell phone having a yes button, a no button, and an emergency button, and more particularly, relates to a cell phone having only a yes button, a no button, and an emergency button such that a user can find and dial each of a plurality of contacts by pressing the yes button or the no button in response to a plurality of questions displayed on a screen of the cell phone or played via a speaker of the cell phone.

BRIEF SUMMARY

It is an object of the present application to provide a communication device that communicates via a base station through a radio link, the communication device including: a display that displays an inquiry from a plurality of inquiries, a phone number being dialed, and/or a contact name being dialed, a first input, which upon being activated, indicates an agreement in response to the inquiry from the plurality of inquiries, a second input, which upon being activated, indicates a disagreement in response to the inquiry from the plurality of inquiries, an emergency input, which upon being activated, indicates an emergency situation, a controller that selects and dials the phone number corresponding to the contact name from a plurality of phone numbers corresponding to a plurality of contact names based on the indicated agreement, the indicated disagreement, and the indicated emergency situation, the controller including: a memory that stores the plurality of phone numbers and the corresponding plurality of contact names in a plurality of groups and a plurality of sub-groups, a transceiver that communicates with the base station through the radio link, a programming port that is connected to an external device to add, delete, modify, and/or delete the plurality of phone numbers and the plurality of contact names in the memory, a speaker that outputs audio received by or produced in the communication device, and a microphone that receives a voice and converts the voice to a voice signal, such that the agreement and the disagreement with each inquiry of the plurality of inquiries guides the controller in selecting and dialing the phone number corresponding to the contact name from the plurality of phone numbers.

It is an object of the present application to provide a communication device that includes an internal speaker that outputs the audio received by or produced in the communication device, a sensor that determines whether or not the communication device is placed on or in a predetermined distance near an ear, such that upon determination that the communication device is placed on the ear, the internal speaker is muted and the audio is played via the speaker, and upon determination that the communication device is not placed on the ear, the speaker is muted and the audio is played via the internal speaker.

It is an object of the present application to provide communication device such that the first input, the second input, and the emergency input are the only inputs of the communication device, and each inquiry of the plurality of inquiries is displayed on the display.

It is an object of the present application to provide communication device such that each inquiry of the plurality of inquiries is played via the internal speaker or the speaker.

It is an object of the present application to provide communication device such that each inquiry of the plurality of inquiries corresponds to a contact name of the plurality of contact names corresponding to each phone number of the plurality of phone numbers, each group of the plurality of groups, and each sub-group of the plurality of sub-groups, and each group of the plurality of groups includes one or more sub-group of the plurality of sub-groups, and the one or more sub-groups include one or more contact names and corresponding phone numbers.

It is an object of the present application to provide communication device such that the plurality of contact names corresponding to the plurality of phone numbers, the plurality of groups, and the plurality of sub-groups are programmed into the memory from a personal computer or a smart phone.

It is an object of the present application to provide communication device such that the controller of the communication device further includes: a location acquisition unit that acquires a current location of the communication device, and such that the location acquisition unit acquires the current location of the communication device based on a cell tower location and/or global positioning satellite.

It is an object of the present application to provide communication device such that upon activating the emergency input that indicates the emergency situation, the controller of the communication device based on the current location of the communication device, searches for a closest phone number that corresponds to a closest contact name from the plurality of contact names, the closest phone number being the phone number of a closest contact that is geographically located closest to the current location.

It is an object of the present application to provide communication device such that upon activating the emergency input that indicates the emergency situation, the controller of the communication device based on the current location of the communication device, contacts the closest police station.

It is an object of the present application to provide communication device such that the first input is a yes button, the second input is a no button and the emergency input is an emergency button.

It is an object of the present application to provide communication device such that when the yes button is pressed in response to the inquiry, if the inquiry corresponds to whether or not to dial a contact name, the communication device contacts a phone number that corresponds to the contact name, when the no button is pressed in response to the inquiry, if the inquiry corresponds to whether or not to dial a contact name, the communication device does not contact the contact name, and inquires another inquiry from the plurality of inquiries.

It is an object of the present application to provide communication device such that when the yes button is pressed in response to the inquiry, if the inquiry corresponds to whether or not a desired contact name belongs to a group from the plurality of groups, then the communication device inquires the contact names that are stored under the group, and when the no button is pressed in response to the inquiry, if the inquiry corresponds to whether or not the desired contact name belongs to a group from the plurality of groups, the communication device inquires whether or not the desired contact name belongs to another group from the plurality of groups.

It is an object of the present application to provide communication device such that upon pressing and holding the no button for 3 seconds in response to the inquiry, the communication device stop inquiring the plurality of inquiries.

It is an object of the present application to provide communication device such that the plurality of inquiries corresponds to gender, relationship, and geographical area of the contact names.

It is an object of the present application to provide a method for communicating via a communication device that communicates via a base station through a radio link, the method including the steps of: displaying an inquiry from a plurality of inquiries, a phone number being dialed, and/or a contact name being dialed on a display, indicating an agreement when a first input is activated in response to the inquiry from the plurality of inquiries, indicating a disagreement when a second input is activated in response to the inquiry from the plurality of inquiries, indicating an emergency situation when an emergency input is activated, selecting and dialing the phone number corresponding to the contact name from a plurality of phone numbers corresponding to a plurality of contact names based on the indicated agreement, the indicated disagreement, and the indicated emergency situation, such that the agreement and the disagreement with each inquiry of the plurality of inquiries guides the controller in selecting and dialing the phone number corresponding to the contact name from the plurality of phone numbers.

DETAILED DESCRIPTION

The present application discloses a three button cell phone 10 to make and receive telephone calls over a radio link while moving around a wide geographic area. The three button cell phone 10 connects to a cellular network provided by a cell phone operator. The simplicity of the three button cell phone 10 makes the three button cell phone 10 advantageous for use by, for example, elderly people, children, and people with disabilities.

Figure 1:
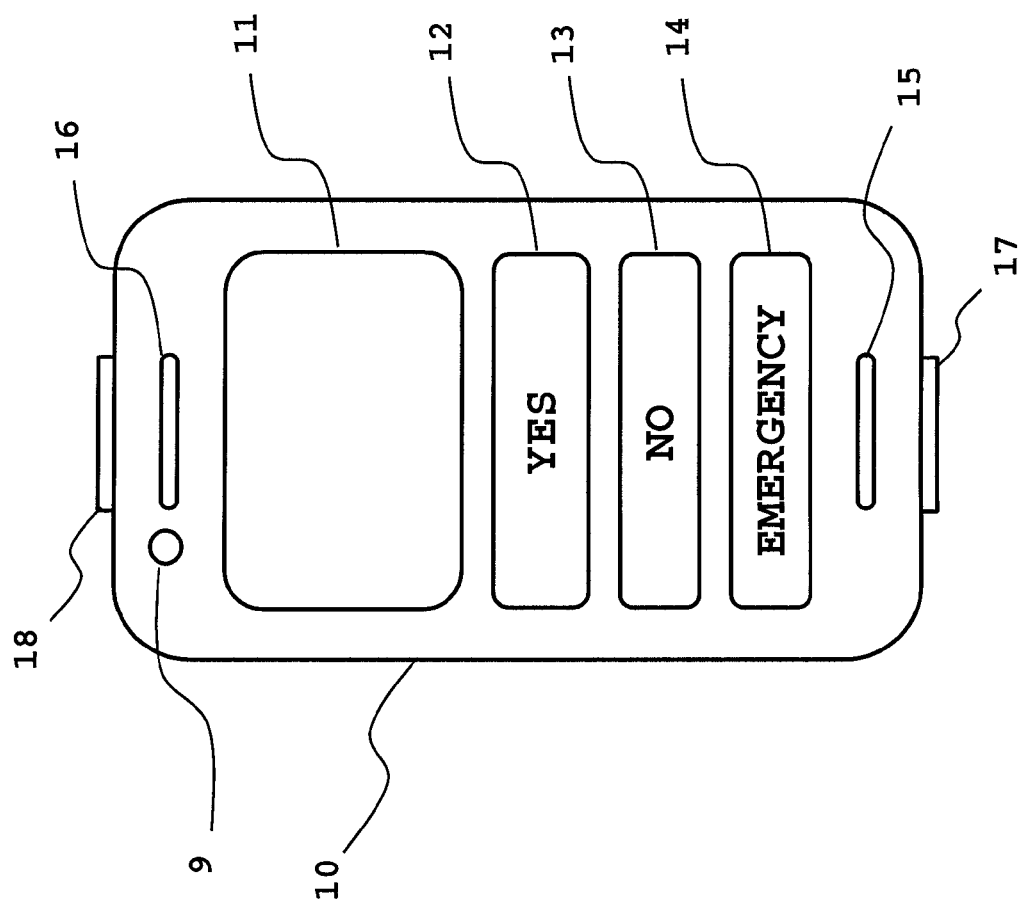
FIG. 1 is a front view of an exemplary embodiment of a three button cell phone having only a yes button, a no button, and an emergency button according to one example.

FIG. 1 is a front view of an exemplary embodiment of a three button cell phone 10 that includes only a yes button 12, a no button 13, and an emergency button 14 (that are collectively referred to as the buttons in this application). The three button cell phone 10 further includes a sensor 9, an ear speaker 16, an internal speaker 18, a display 11, a microphone 15, and a socket 17. Instead of the conventional twelve-key keypad, the yes button 12, the no button 13, and the emergency button 14 can initiate a call, answer a call, and terminate a call. Additionally, the yes button 12 and the no button 13 can be used to find a contact from a plurality of contacts or pre-stored contact list of the three button cell phone 10 to initiate a call. It should be noted that the three button cell phone 10 is described in this application having only three buttons but in other embodiments of the present application, the three button cell phone 10 may have more than three buttons, for example, a power button to switch on and off the three button cell phone 10.

The internal speaker 18 and the ear speaker 16 output the voices that are received by or produced in the three button cell phone 10. The sensor 9 can detect whether the three button cell phone 10 is placed on an ear of a user, or a user is holding the three button cell phone 10 in hands such that the display 11 can be checked/viewed. When the user is holding the three button cell phone 10 in hands such that the display 11 can be checked/viewed, the voices are played only via the internal speaker 18 of the three button cell phone 10 and the ear speaker 16 of the three button cell phone 10 is muted. When the user places the three button cell phone 10 on the ear, then the voices are only played via the ear speaker 16 of the three button cell phone 10 and the internal speaker 18 of the three button cell phone 10 is muted. It should be noted that when the three button cell phone 10 receives an incoming call, the internal speaker 18 signals an incoming call ring tone to alert the user with respect to the incoming call.

The sensor 9 can be a proximity sensor, such as an ultra sonic sensor, that generates high frequency sound waves and evaluates an echo which is received back by the sensor. Further, the sensor 9 may deactivate the display 11 and the buttons when the three button cell phone 10 is brought near the face during a call. This is done to save battery power and to prevent inadvertent inputs from the user's face and ears. The sensor 9 can be a light sensor such that when the user places the three button cell phone 10 on the ear, the sensor 9 senses a reduction in an amount of ambient light and/or adjusts the display 11 brightness which in turn saves battery power. It should be noted that a proximity sensor is a sensor that is able to detect the presence of nearby objects without any physical contact and often emits an electromagnetic field or a beam of electromagnetic radiation, such as infrared, and determines changes in the field or return signal. The object being sensed is often referred to as the proximity sensor's target. Different proximity sensor can be utilized in the three button cell phone 10 and the functionality of the three button cell phone 10 is independent of a type of the sensor 9 used.

The yes button 12, the no button 13, and the emergency button 14 can be push buttons with a switch mechanism that are made of hard material, for example, plastic or metal. Alternatively, a touch screen display can replace the display 11 and the yes button 12, the no button 13, and the emergency button 14 can be virtual buttons on the touch screen display.

The microphone 15 receives a user voice and converts it to a voice signal that is transmitted by the three button cell phone 10. The microphone 15 can be of any type that is used in cell phones, such as an electret condenser microphone.

The socket 17 allows the three button cell phone 10 to be electrically connected to a power supply that charges a battery of the three button cell phone 10. Additionally, the socket can be connected to a personal computer in order to receive/edit a list of contacts and corresponding phone numbers for the contacts. The socket 17 can be a male or a female socket. Additionally, the socket 17 can be an industry standard socket, such as a Universal Serial Bus (USB) socket, or can be a non-standard socket. The socket may have a plurality of pins that are allocated for charging and for data transfer.

A plurality of contacts can be stored on a memory 30 of the three button cell phone 10. Each contact of the plurality of contacts corresponds to a phone number, which upon dialing, dials the phone number associated with the contact. The plurality of contacts can only be added/deleted/edited via an external device and when the three button cell phone 10 is connected to the external device. Examples of externals devices that can be connected to the three button cell phone 10 include, but are not limited to, a personal computer, a laptop, a smart phone, and/or a tablet computer.

The emergency button 14 allows a user of the three button cell phone 10 to make an emergency phone call to one of the plurality of contacts that are stored in the three button cell phone 10. When a user presses the emergency button 14, a location acquisition unit 38 of the three button cell phone 10 first acquires a current location of the three button cell phone 10. The current location acquisition may be preformed by the location acquisition unit 38 that uses a cell tower location and/or global positioning satellite (GPS) to obtain a location. It should be noted that similar techniques that are used to obtain a location of an electronic device can also be used with the three button cell phone 10 and functionality of the three button charger 10 is independent of a type of the location acquisition technique. After the three button cell phone 10 acquires the current location of the three button cell phone 10, it searches for the contacts in the memory 30 and finds a contact that is geographically located closest to the three button cell phone 10. The three button cell phone 10 may find the geographically closest contact based on an area code of the contacts. Alternatively, the three button cell phone 10 may find the geographically closest contact based on a previously stored location of the contact. Then, after finding the closest contact, the three button cell phone 10 dials the closest contact that is found. In case that the closest contact is not responding to the call, the three button cell phone 10 may find and dial the next closest contact. Alternatively, the three button cell phone 10 may ask, after finding the closest contact, whether or not the user desires to contact the closest contact that is found by the three button cell phone 10. In response the user may press the yes button 12 as an indication that the user intends to make a phone call to the closest contact, or may press the no button 13 as an indication that the user intends to hear the next available contact who is geographically close to the user. In order to prevent accidentally dialing an emergency contact by accidentally pressing the emergency button 14, the emergency button 14 may be programmed to be activated when pressed in a predetermined sequence or manner. For example, the emergency button 14 may be programmed to dial the emergency contact when pressed and hold for 3, 5, 10, 15, or 20 seconds. Alternatively, the emergency button 14 may be programmed to dial the emergency contact when pressed and released consequently for two, three, or four times. Additionally, the emergency button 14 can be programmed such that when activated, the three button cell phone 10 inquires whether or not the user desires to contact the police department instead of the closest contact, and when the user does not reply to the inquiry during a predetermined period of time, for example, 5, 10, 20, or 30 seconds, the three button cell phone 10 automatically contacts the police department.

Figure 2:
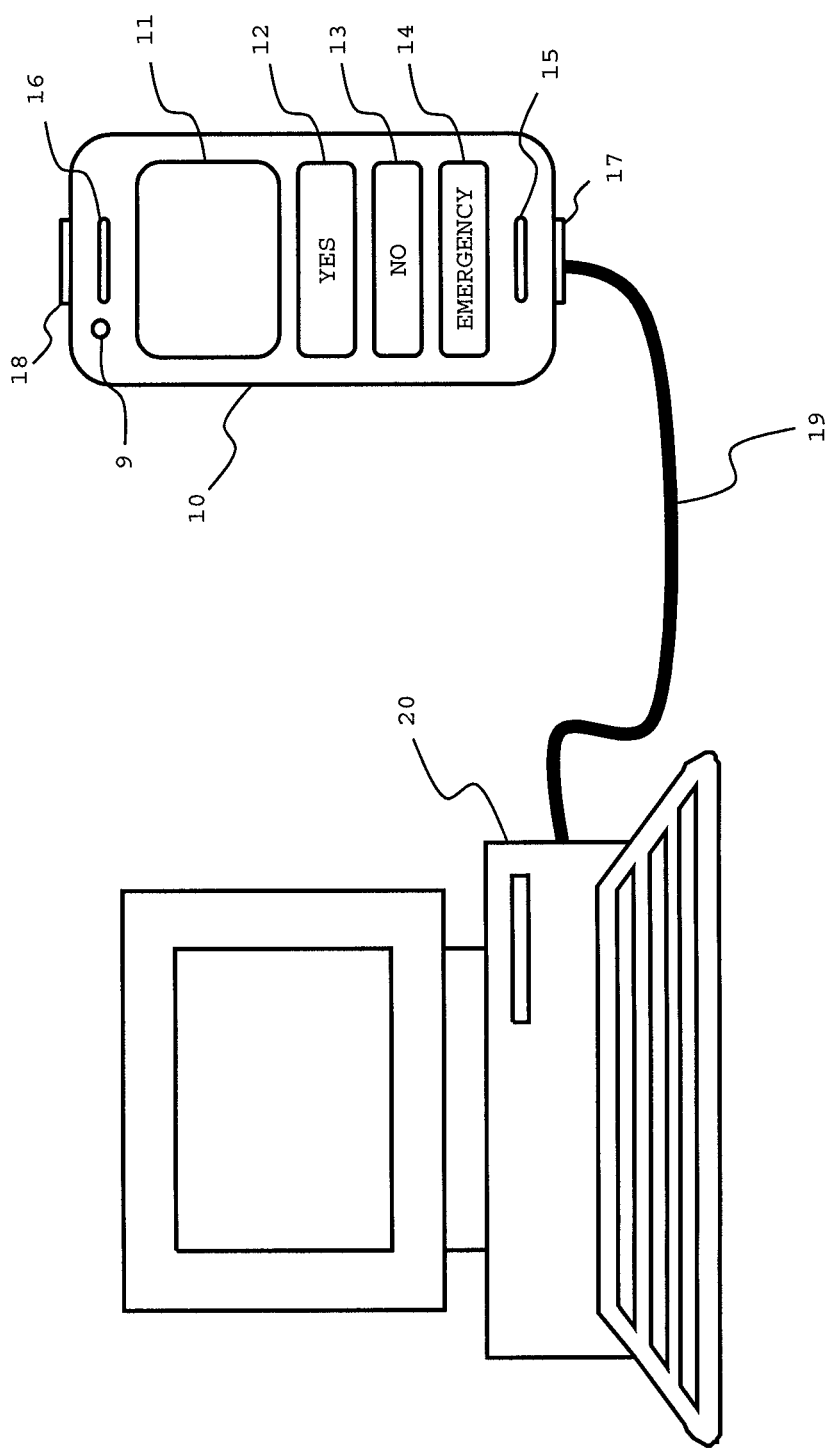
FIG. 2 is an exemplary embodiment of a three button cell phone having only a yes button, a no button, and an emergency button that is connected to a personal computer via a cable according to one example.
Figure 3:
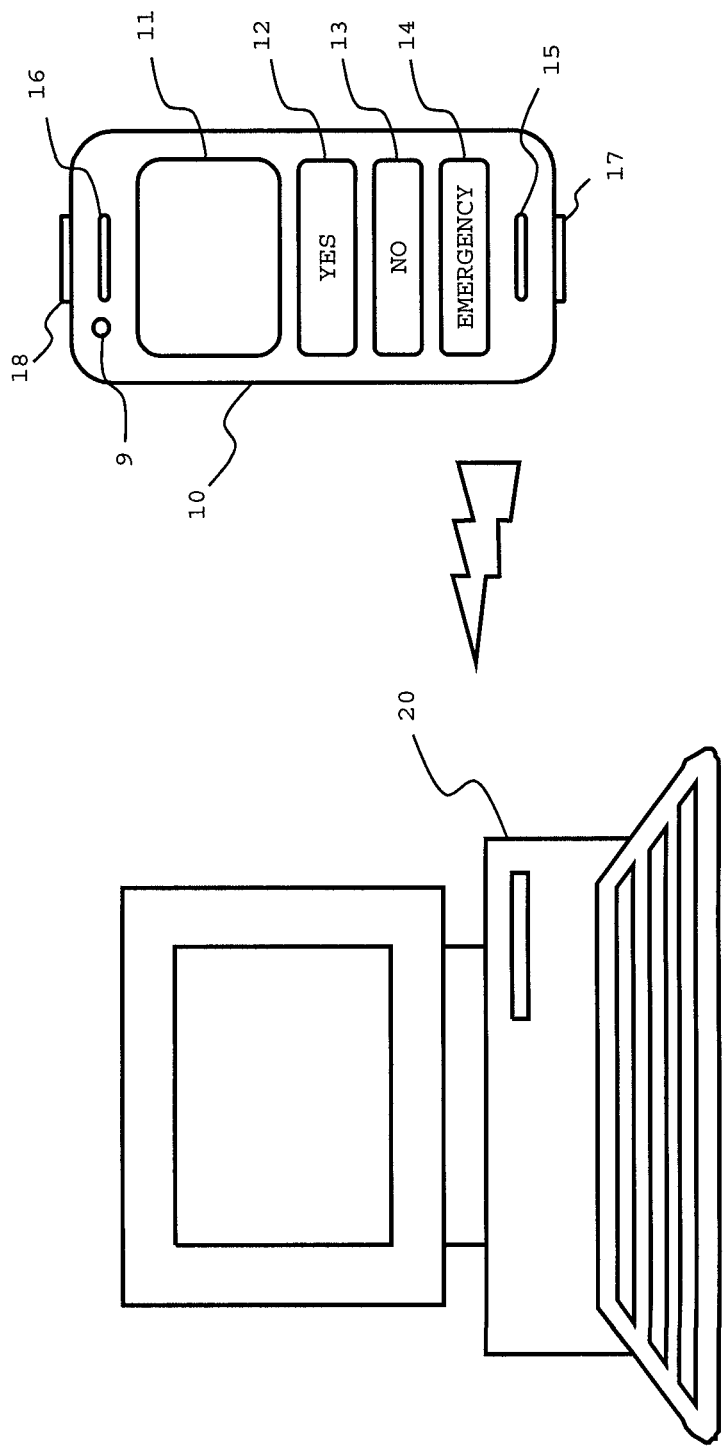
FIG. 3 is an exemplary embodiment of a three button cell phone having only a yes button, a no button, and an emergency button that is connected to a personal computer via a wireless connection according to one example.

FIG. 2 and FIG. 3 are an exemplary embodiment of the three button cell phone 10 that includes only the yes button 12, the no button 13, and the emergency button 14 and are connected to a personal computer 20 via a cable 19, and to a personal computer via a wireless communication, respectively. The connection from the three button cell phone 10 to the external device, for example, to the personal computer 20 can be made via a wired connection, such as a USB connection, or a wire less connection, such as a blue tooth connection. When connected, the contacts that are stored in the memory 30 of the three button cell phone 10 can be edited, modified, added, and/or deleted. For example, an address can be assigned to each of the plurality of contacts that is used by the three button cell phone 10 to find a location of each of the plurality of contacts when dialing an emergency contact.

Figure 4:
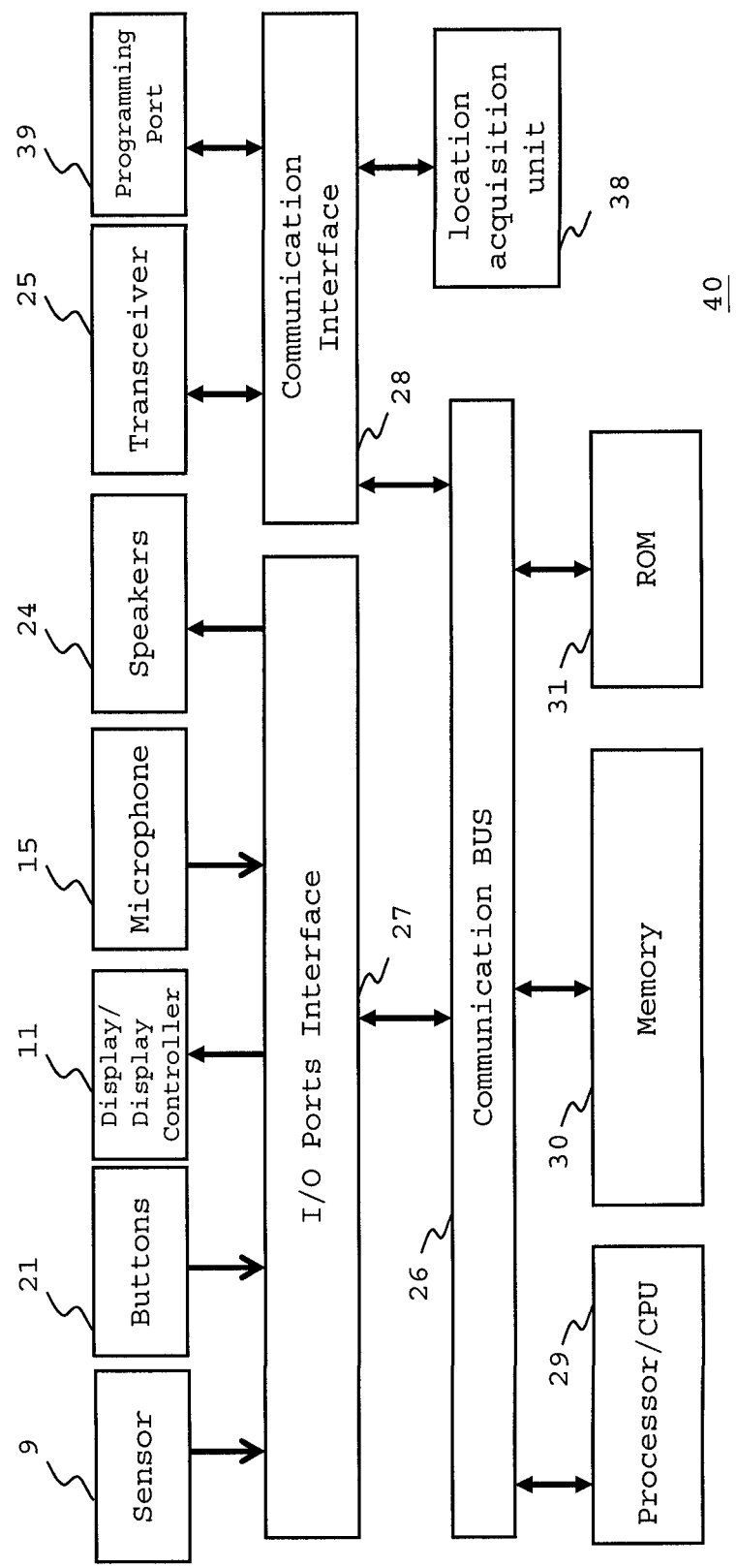
FIG. 4 is an exemplary a block diagram of a three button cell phone having only a yes button, a no button, and an emergency button according to one example.

FIG. 4 is an exemplary block diagram of a three button cell phone system 40 of the three button cell phone 10 having only a yes button 12, a no button 13, and an emergency button 14 that are illustrated and referred to in FIG. 4 as buttons 21. FIG. 4 shows the three button cell phone system 40 upon which an embodiment of the present application may be implemented. The three button cell phone system 40 includes a bus 26 or other communication mechanism for communicating information, and a processor/CPU 29 coupled with the bus 26 for processing the information. The three button cell phone system 40 also includes a memory 30, such as a random access memory (RAM) or other dynamic storage device (e.g., dynamic RAM (DRAM), static RAM (SRAM), and synchronous DRAM (SDRAM)), coupled to the bus 26 for storing information and instructions to be executed by the CPU 29. In addition, the memory 30 may be used for storing temporary variables or other intermediate information during the execution of instructions by the processor 29. The three button cell phone system 40 further includes a read only memory (ROM) 31 or other static storage device (e.g., programmable ROM (PROM), erasable PROM (EPROM), and electrically erasable PROM (EEPROM)) coupled to the bus 26 for storing static information and instructions for the CPU 29. For example, the plurality of contacts and corresponding phone numbers can be stored in ROM 31.

The three button cell phone system 40 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The three button cell phone system 40 also includes a display/display controller 11 coupled to the bus 26 via an I/O interface 27. The display/display controller 11 may be a touch screen display or may be an LCD for displaying information to a user. The three button cell phone system 40 includes the buttons 21 for interacting with a user and providing information to the CPU 29. The buttons 21 includes the yes button 12, the no button 13, and the emergency button 14. Further, the three button cell phone system 40 includes speakers 24 (the ear speaker 16 and the internal speaker 18), the microphone 15, and the sensor 9.

The three button cell phone system 40 performs a portion or all of the processing steps of the application in response to the CPU 29 executing one or more sequences of one or more instructions contained in a memory, such as the memory 30. One or more processors in a multi-processing arrangement may also be employed to execute the sequences of instructions contained in memory 30. In alternative embodiments, hard-wired circuitry may be used in place of or in combination with software instructions.

Thus, embodiments are not limited to any specific combination of hardware circuitry and software. As stated above, the three button cell phone system 40 includes at least one computer readable medium or memory for holding instructions programmed according to the teachings of the application and for containing a plurality of contact list, phone numbers, data structures, tables, records, or other data described herein.

Stored on any one or on a combination of computer readable media, the present application includes software for controlling the three button cell phone system 40, for driving a device or devices for implementing the three button cell phone 10, and for enabling the three button cell phone system 40 to interact with a user. Such software may include, but is not limited to, device drivers, operating systems, development tools, and applications software. Such computer readable media further includes the computer program product of the present application for performing all or a portion (if processing is distributed) of the processing performed in implementing the application.

The computer code devices of the present application may be any interpretable or executable code mechanism, including but not limited to scripts, interpretable programs, dynamic link libraries (DLLs), Java classes, and complete executable programs. Moreover, parts of the processing of the present application may be distributed for better performance, reliability, and/or cost. The term "computer readable medium" as used herein refers to any medium that participates in providing instructions to the processor 29 for execution. A computer readable medium may take many forms, including but not limited to, non-volatile media, volatile media, and transmission media. Transmission media includes coaxial cables, copper wire and fiber optics, including the wires that make up the bus 26. Transmission media also may also take the form of acoustic or light waves, such as those generated during radio wave and infrared data communications.

Various forms of computer readable media may be involved in carrying out one or more sequences of one or more instructions to processor 29 for execution. The remote computer can load the instructions for implementing all or a portion of the present application remotely into a dynamic memory and send the instructions over a cable using a modem or USB port. The bus 26 carries the data to the memory 30, from which the processor 29 retrieves and executes the instructions. The instructions received by the memory 30 may optionally be stored on a storage device either before or after execution by processor 29. The three button cell phone system 40 also includes a communication interface 28 coupled to the bus 26. The communication interface 28 provides a two-way data communication coupling to a transceiver 25 that is connected to, for example, a wireless communication network, a cellular network, and/or a mobile network. The transceiver 25 sends and receives electromagnetic signals that carry digital data streams representing various types of information, such as voice, between the three button cell phone 10 and a base station. The transceiver 25 may further include an antenna.

A programming port 39 typically provides data communication between the three button cell phone system 40 through one or more networks to other data devices. For example, the programming port 39 may provide a connection to another computer through a local network (e.g., a LAN), a USB cable, or through equipment operated by a service provider. The programming port 39 and the transceiver 25 use, for example, electrical, electromagnetic, or optical signals that carry digital data streams, and the associated physical layer (e.g., CAT 5 cable, coaxial cable, optical fiber, etc). The signals through programming port 39 carry the digital data to and from the three button cell phone system 40 to an external device maybe implemented in baseband signals, or carrier wave based signals. The programming port 39 is accessible via the socket 17. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent via the programming port 39 as unmodulated baseband data through a "wired" communication channel and/or sent within a predetermined frequency band, different than baseband, by modulating a carrier wave.

The three button cell phone system 40 can transmit and receive data, including program code, via the programming port 39 and/or the transceiver 25. Moreover, the programming port 39 may provide a connection through a LAN or another type of a standard communication protocol, such as USB, to another mobile device, such as a personal digital assistant (PDA) laptop computer, or cellular telephone.

In one preferred embodiment of the present application, the three button cell phone system 40 can receive text messages as a method for programming the contact list. The three button cell phone system 40 extracts and stores the contact information from the text message into the memory 30 of the three button cell phone system 40 so that the contact information can be used when a user intends to make a phone call. The contact information that is extracted from the text message can be added to the contact list of the three button cell phone system 40. For example, in one embodiment, after the three button cell phone system 40 receives the text message, the three button cell phone system 40 inquires from the user whether or not the user desires to add the received/extracted contact information to the existing contact list. In response the user may press the yes button 12 or the no button 13 to accept or deny entry of the received/extracted contact information to an existing contact list.

Figure 5:
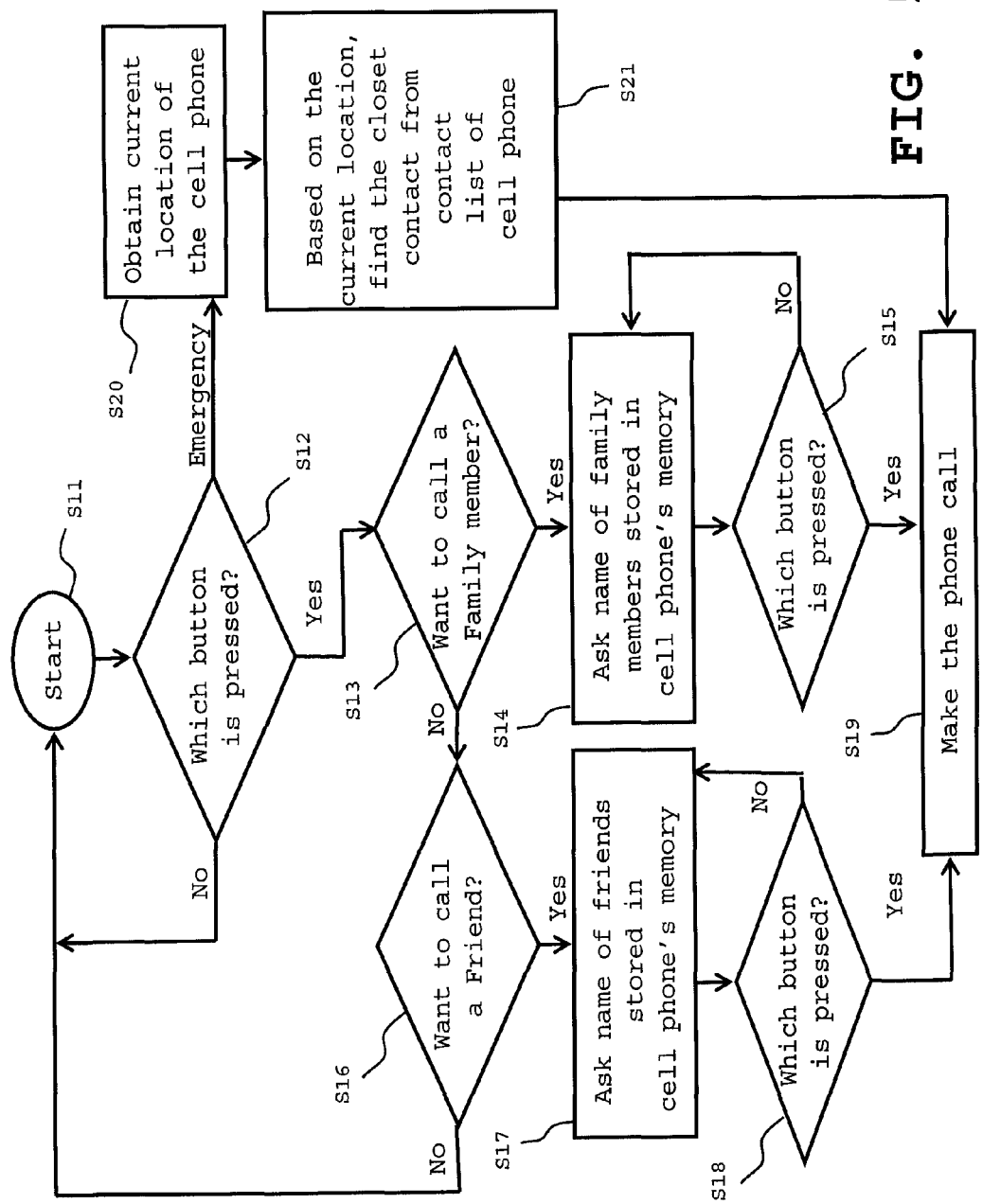
FIG. 5 is an exemplary process flow chart for a three button cell phone having only a yes button, a no button, and an emergency button according to one example.

FIG. 5 is an exemplary process flow chart for the three button cell phone system 40. At S11, the process starts. At S12, the three button cell phone system 40 determines whether or not at least one of the yes button 12, the no button 13, and the emergency button 14 is pressed. If the three button cell phone system 40 determines that no button has been pressed, the three button cell phone system 40 re-starts the process again from S11. If the three button cell phone system 40 determines that one of the yes button 12 or the emergency button 14 is pressed, the three button cell phone system 40 preforms the tasks of S13 or S20, respectively.

After S12, when the emergency button 14 is pressed, the three button cell phone system 40 obtains a current location of the three button cell phone system 40 at S20. After obtaining the current location, the three button cell phone system 40, at S21, searches in the contact list of the three button cell phone system 40 for a contact that is geographically located closest to the current location as discussed previously herein. After finding the closest contact, the three button cell phone system 40 dials the contact at S19. After the call is finished, the user may press the no button 13 to terminate the call.

In other embodiments, the three button cell phone system 40 may ask a user whether or not the user desires to dial the contact that is determined to be the closest. The three button cell phone system 40 may ask the user by showing the question via the display 11 of the three button cell phone system 40 or may ask the user by playing the question via speakers 24 of the three button cell phone system 40. The user can use the yes button 12 and the no button 13 to communicate with the three button cell phone system 40 to provide a response to the inquiry by the three button cell phone system 40. Yet, in another embodiment, the three button cell phone system 40 may ask a user whether or not the user desires to dial the contact that is determined to be the closest and set a time-out period. When a response is not received from the user after the time-out period, the three button cell phone system 40 may contact the next closest contact or may contact a nearby police department.

After S12, when the yes button 12 is pressed, the three button cell phone system 40 at S13 inquires from the user whether or not the user intends to dial a contact that is stored in/belong to a first group of contacts, for example, the three button cell phone system 40 inquires from the user whether or not the user intends to contact a family member. It should be noted that the plurality of contacts are pre-stored in the three button cell phone system 40 in a plurality of groups such as family members, friends, co-workers, etc.

If the user presses the yes button 12 in response to the inquiry by the three button cell phone system 40 (i.e. the user desires to dial a contact that is a family member), then the three button cell phone system 40 obtains the contact information from the family member contact list. Then, at S14, the three button cell phone system 40 inquires from the user the name of each of the contacts in the family member contact list one by one followed by a question. In response, the user may press the yes button 12 or the no button 13, at S15, as an indication that the inquired contact is the contact that the user desires to dial. If the yes button 12 is pressed, then the three button cell phone system 40 dials the contact at S19. If the no button 13 is pressed in response to the inquires, the three button cell phone system 40 inquires a next contact from the family member contact list.

It should be noted that if the three button cell phone system 40 inquires about all of the contacts belonging to the first group at S14 and the user presses the no button 13 in response to all of the inquiries, then the three button cell phone system 40 may inform the user that all of the contacts were inquired and may ask the user whether or not the user desires to hear the contacts from the second group. If the user presses the no button 13, then the three button cell phone system 40 terminates the inquires and the process re-starts at S11. If the user presses the yes button 12, then the three button cell phone system 40, the process continues at S16. This process can be applied to all of contact groups in the three button cell phone system 40. The contact groups can be one, two, three, or more different contact groups. It should be noted that a contact may belong to exactly one contact list, or may belong to more than one contact list. For example, a contact may belong to both family member list and friend list. Alternatively, a contact can be assigned to only one contact list. For example, when a contact is assigned to the family member list, it can not be assigned to the friend list anymore unless it is removed from the family member list.

At S13, when the no button 13 is pressed (i.e. the user does not want to dial a contact that is a family member), the three button cell phone system 40 at S16 inquires from the user whether or not the user intends to dial a contact that is stored in/belong to a second group of contacts, for example, the three button cell phone system 40 inquires from the user whether or not the user intends to contact a friend.

If the user presses the yes button 12 in response to the inquiry by the three button cell phone system 40 (i.e. the user wants to dial a contact that is a friend), then the three button cell phone system 40 obtains the contact information from the friends contact list. Then, at S17, the three button cell phone system 40 inquires from the user the name of each of the contacts in the friends contact list one by one followed by a question. In response, the user may press the yes button 12 or the no button 13, at S18, as an indication that the inquired contact is the contact that the user desires to dial. If the yes button 12 is pressed, then the three button cell phone system 40 dials the contact at S19. If the no button 13 is pressed in response to an inquiry, the three button cell phone system 40 inquires about the next contact from the friends contact list.

In order to terminate the process of finding a contact from the plurality of contact without going through all of the plurality of contacts, a user may press and hold the no button 13 for a period of time, for example, for 3, 4, or 5 seconds to restart the process at S11.

It should be noted that the three button cell phone system 40 may inquire the contacts in a predefined/predetermined order. For example, the three button cell phone system 40 may inquire about each of the contacts in the contact list based on alphabetical order, based on geographical location, based on gender, or based on frequency and history and past call that have been made to a contact. For example, the three button cell phone system 40 may start inquiring about a contact from the contact list that the user has called more than other user in the past.

Figure 6:
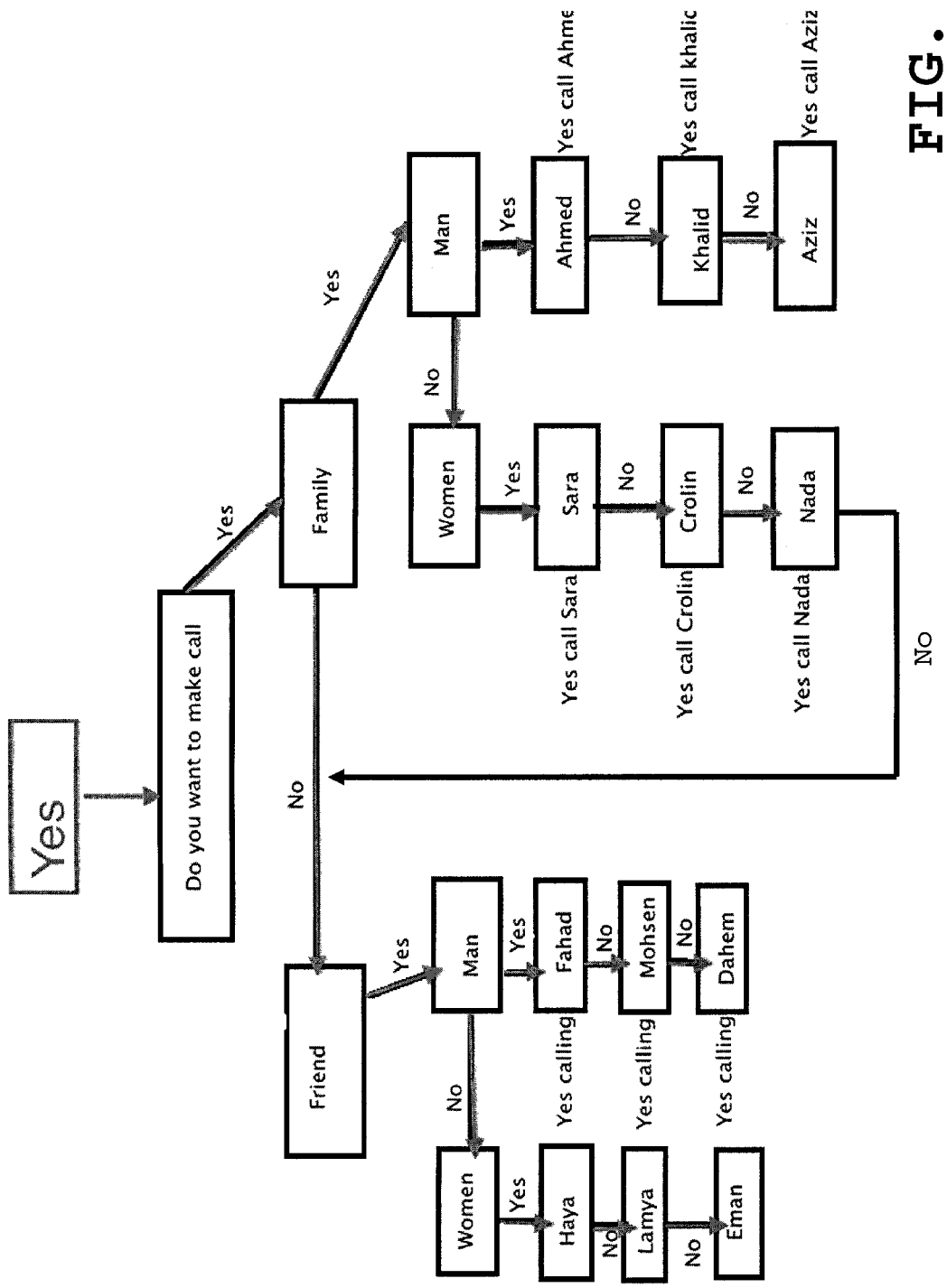
FIG. 6 is an exemplary process flow chart for a three button cell phone having only a yes button, a no button, and an emergency button according to one example.

FIG. 6 is an exemplary process flow chart for the three button cell phone system 40. In this exemplary process flow chart, the three button cell phone system 40 first inquires whether or not a user desires to make a phone call. If the user indicates the desire to make a phone call by pressing the yes button 12, then the three button cell phone system 40 inquires whether or not the user desires to call a family member. If the user indicates the desire to call a family member by pressing the yes button 12, then the three button cell phone system 40 inquires whether the user desires to call a family member who is a male or a female. If the user indicates the desire to call a male by pressing the yes button 12, then the three button cell phone system 40 inquires whether or not the user desires to call a contact named Ahmed. Similarly, if the user indicates that he/she does not want to call a family member by pressing the no button 13, then the three button cell phone system 40 inquires whether or not the user desires to call a friend who is a male or a female. When the user indicates that a call to a friend is desired who is a male, then the three button cell phone system 40 only inquires contact names who are male and ignores inquiring about female contact names. Similarly, the user may indicate that a call is desired to a contact name that is geographically located within 10, 20, 30, 50, or 100 miles from a current location of the user, the three button cell phone system 40 only inquires contact names who are geographically located within 10, 20, 30, 50, or 100 miles from a current location of the user, respectively, and ignores other contact names.

It should be noted that the plurality of questions, i.e. inquiring whether the user intends to contact a family member or a friend, and a male or a female helps the user narrow down the inquiries related to the contact list. As such, the user can find the desired contact name faster by eliminating the contact names in the groups that the user does not wish to contact. The contact names may belong to similar groups and sub-groups that categorize the contact names based on, for example, gender, geographical area, relationship, to help the user in narrowing down when the user intends to select and dial a contact list. If the user indicates that contacting a group, for example, a male or a co-worker, is not desired, the three button cell phone system 40 skips inquiries related to the groups that the user does not intend to contact.

Although the foregoing description is directed to the preferred embodiments, it is noted that other variations and modifications will be apparent to those skilled in the art, and may be made without departing from the spirit or scope of this application. For example, they three button cell phone can be substituted by any other communication device. Additionally, the buttons can be physical buttons or virtual buttons of a touch screen display that can be pressed (activated). Moreover, features described in connection with one embodiment of the application may be used in conjunction with other embodiments, even if not explicitly stated above.

The invention claimed is:

1. A communication device that communicates via a base station through a radio link, said communication device comprising:
- a display that displays a first inquiry from a plurality of first inquiries, a phone number being dialed, and/or a contact name being dialed, the plurality of first inquiries including a family inquiry, friend inquiry and coworker inquiry;
- a first input, which upon being activated, indicates an agreement in response to said first inquiry from said plurality of first inquiries;
- a second input, which upon being activated, indicates a disagreement in response to said first inquiry from said plurality of first inquiries;
- an emergency input, which upon being activated, indicates an emergency situation;
- a controller that selects and dials said phone number corresponding to said contact name from a plurality of phone numbers corresponding to a plurality of contact names based on said indicated agreement, said indicated disagreement, and said indicated emergency situation, said controller including:
  - a memory that stores said plurality of phone numbers and said corresponding plurality of contact names in a plurality of groups and a plurality of sub-groups, each group corresponding to one of the first inquiries, each sub-group corresponding to one of second inquiries;
  - a transceiver that communicates with said base station through said radio link;
  - a programming port that is connected to an external device to add, delete, modify, and/or delete said plurality of phone numbers and said plurality of contact names in said memory;
- a speaker that outputs audio received by or produced in said communication device; and
- a microphone that receives a voice and converts said voice to a voice signal, wherein the controller
  (1) displays, in response to a selection of the first input when one of the plurality of first inquiries is displayed, a second inquiry of the plurality of second inquiries, the second inquiries including a man inquiry and a woman inquiry, and in response to a selection of the first input when one of the second inquiries is displayed, the controller displays a list of contact names corresponding to the selected first and second inquiry,
  displays, in response to a selection of the second input when one of the plurality of first inquiries is displayed, a different one of the first inquiries and repeats the processing of (1),
said agreement and said disagreement with each inquiry of said plurality of inquiries guides said controller in selecting and dialing said phone number corresponding to said contact name from said plurality of phone numbers,
wherein upon activating said emergency input that indicates said emergency situation, said controller of said communication device based on said current location of said communication device, searches for a closest phone number that corresponds to a closest contact name from all of said plurality of contact names, said closest phone number being said phone number of a closest contact that is geographically located closest to said current location,
wherein said first input is a yes button, said second input is a no button, and said emergency input is an emergency button, and said first input, second input and emergency input are the only inputs of said communication device.

2. The communication device according to claim 1, further comprising:
- an internal speaker that outputs said audio received by or produced in said communication device;
- a sensor that determines whether or not said communication device is placed on or in a predetermined distance near an ear, wherein upon determination that said communication device is placed on said ear, said internal speaker is muted and said audio is played via said speaker, and
- upon determination that said communication device is not placed on said ear, said speaker is muted and said audio is played via said internal speaker.

3. The communication device according to claim 2, wherein said internal speaker or said speaker are configured to play at least one inquiry of the plurality of first inquiries.

4. The communication device according to claim 1, wherein said plurality of contact names corresponding to said plurality of phone numbers, said plurality of groups, and said plurality of sub-groups are programmed into the memory from a personal computer or a smart phone.

5. The communication device according to claim 2, said controller of said communication device further includes:
- a location acquisition unit that acquires a current location of said communication device, wherein
- said location acquisition unit acquires said current location of said communication device based on a cell tower location and/or global positioning satellite.

6. The communication device according to claim 5, wherein
upon activating said emergency input that indicates said emergency situation, said controller of said communication device based on said current location of said communication device, contacts the closest police station.

7. The communication device according to claim 1, wherein
when said yes button is pressed in response to a particular inquiry, if the particular inquiry corresponds to whether or not to dial a contact name, said communication device contacts a phone number that corresponds to said contact name,
when said no button is pressed in response to said particular inquiry, if the particular inquiry corresponds to whether or not to dial a contact name, said communication device does not contact said contact name, and inquiries another inquiry.

8. The communication device according to claim 1, wherein
when said yes button is pressed in response to said first inquiry, if the first inquiry corresponds to whether or not said contact name from said plurality of contact names belongs to a group from said plurality of groups, then said communication device inquiries said contact names that are stored under said group, and
when said no button is pressed in response to said first inquiry, if the inquiry corresponds to whether or not said contact name from said plurality of contact names belongs to a group from said plurality of groups, said communication device inquiries whether or not said contact name belongs to another group from said plurality of groups.

9. The communication device according to claim 1, wherein
upon pressing and holding said no button for 3 seconds in response to said first inquiry, said communication device stops displaying said plurality of inquiries.

10. The communication device according to claim 1, wherein
said plurality of first inquiries further include inquiries relating to geographical area data with respect to said contact names.

11. A method for communicating via a communication device that communicates via a base station through sa radio link, said method comprising the steps of:
displaying, on a display screen, a first inquiry from a plurality of first inquiries, a phone number being dialed, and/or a contact name being dialed on a display, the plurality of first inquiries including a family inquiry, friend inquiry and coworker inquiry;
storing, in a memory, said plurality of phone numbers and said corresponding plurality of contact names in a plurality of groups and a plurality of sub-groups, each group corresponding to one of the first inquiries, each sub-group corresponding to one of second inquiries;
indicating an agreement when a first input is activated in response to said first inquiry from said plurality of first inquiries;
indicating a disagreement when a second input is activated in response to said first inquiry from said plurality of first inquiries;
indicating an emergency situation when an emergency input is activated;
selecting and dialing, via a processor, said phone number corresponding to said contact name from the plurality of phone numbers corresponding to a plurality of contact names based on said indicated agreement, said indicated disagreement, and said indicated emergency situation;
(1) displaying, in response to activation of the first input when one of the plurality of first inquiries is displayed, a second inquiry of the plurality of second inquiries the second inquiries including a man inquiry and a woman inquiry, and in response to a selection of the first input when one of the second inquiries is displayed, the controller displays a list of contact names corresponding to the selected first and second inquiry; and
displaying, in response to a selection of the second input when one of the plurality of first inquiries is displayed, a different one of the first inquiries and repeating the processing of (1), wherein
said agreement and said disagreement with each inquiry of said plurality of inquiries guides said controller in selecting and dialing said phone number corresponding to said contact name from said plurality of phone numbers,
wherein upon activating said emergency input that indicates said emergency situation, said controller of said communication device based on said current location of said communication device, searches for a closest phone number that corresponds to a closest contact name from all of said plurality of contact names, said closest phone number being said phone number of a closest contact that is geographically located closest to said current location,
wherein said first input is a yes button, said second input is a no button, and said emergency input is an emergency button, and said first input, second input and emergency input are the only inputs of said communication device.

12. A communication device that communicates via a base station through a radio link, said communication device comprising:
a display that displays a first inquiry from a plurality of first inquiries, a phone number being dialed, and/or a contact name being dialed, the plurality of first inquiries including a family inquiry, friend inquiry and coworker inquiry;
a first input, which upon being activated, indicates an agreement in response to said first inquiry from said plurality of first inquiries;
a second input, which upon being activated, indicates a disagreement in response to said first inquiry from said plurality of first inquiries;
an emergency input, which upon being activated, indicates an emergency situation;
a controller that selects and dials said phone number corresponding to said contact name from a plurality of phone numbers corresponding to a plurality of contact names based on said indicated agreement, said indicated disagreement, and said indicated emergency situation, said controller including:
a memory that stores said plurality of phone numbers and said corresponding plurality of contact names in a plurality of groups and a plurality of sub-groups, each group corresponding to one of the first inquiries, each sub-group corresponding to one of second inquiries;
a transceiver that communicates with said base station through said radio link;
a programming port that is connected to an external device to add, delete, modify, and/or delete said plurality of phone numbers and said plurality of contact names in said memory;
a speaker that outputs audio received by or produced in said communication device; and
a microphone that receives a voice and converts said voice to a voice signal,
wherein the controller
(1) displays, in response to a selection of the first input when one of the plurality of first inquiries is displayed, a second inquiry of the plurality of second inquiries, the second inquiries including a man inquiry and a woman inquiry, and in response to a selection of the first input when one of the second inquiries is displayed, the controller displays a list of contact names corresponding to the selected first and second inquiry,
displays, in response to a selection of the second input when one of the plurality of first inquiries is displayed, a different one of the first inquiries and repeats the processing of (1),
said agreement and said disagreement with each inquiry of said plurality of inquiries guides said controller in selecting and dialing said phone number corresponding to said contact name from said plurality of phone numbers, and
the controller displays the list of names based on the selection of the first inquiry and second inquiry in an order based on a frequency of calls made to the contact names in the list of contact names,
wherein upon activating said emergency input that indicates said emergency situation, said controller of said communication device based on said current location of said communication device, searches for a closest phone number that corresponds to a closest contact name from all of said plurality of contact names, said closest phone number being said phone number of a closest contact that is geographically located closest to said current location, wherein said first input is a yes button, said second input is a no button, and said emergency input is an emergency button, and said first input, second input and emergency input are the only inputs of said communication device.

13. The communication device according to claim 1, wherein the emergency input is activated when pressed and released consequently at least two times.

\* \* \* \* \*